(12) United States Patent
Sugiura

(10) Patent No.: US 9,073,573 B2
(45) Date of Patent: Jul. 7, 2015

(54) STEERING SYSTEM

(71) Applicant: JTEKT CORPORATION, Osaka-shi, Osaka (JP)

(72) Inventor: Tomonori Sugiura, Yamatokoriyama (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/256,602

(22) Filed: Apr. 18, 2014

(65) Prior Publication Data

US 2014/0318303 A1 Oct. 30, 2014

(30) Foreign Application Priority Data

Apr. 24, 2013 (JP) ................. 2013-091705

(51) Int. Cl.
*B62D 1/18* (2006.01)
*B62D 1/184* (2006.01)

(52) U.S. Cl.
CPC . *B62D 1/18* (2013.01); *B62D 1/184* (2013.01)

(58) Field of Classification Search
CPC .................................. B62D 1/18; B62D 1/184
USPC ............................................. 74/493; 280/775
See application file for complete search history.

(56) References Cited

U.S. PATENT DOCUMENTS

| 5,743,150 | A | * | 4/1998 | Fevre et al. ..................... 74/493 |
| 5,787,759 | A | * | 8/1998 | Olgren ............................ 74/493 |
| 6,092,957 | A | * | 7/2000 | Fevre et al. .................... 403/373 |
| 6,695,349 | B2 | * | 2/2004 | Bohlen et al. ................. 280/775 |
| 6,792,824 | B2 | * | 9/2004 | Jolley et al. ..................... 74/493 |
| 7,150,204 | B2 | * | 12/2006 | Uphaus et al. .................. 74/493 |
| 7,635,149 | B2 | * | 12/2009 | Menjak et al. ................ 280/775 |
| 7,819,426 | B2 | * | 10/2010 | Streng et al. .................. 280/775 |
| 2004/0261565 | A1 | | 12/2004 | Uphaus et al. |

FOREIGN PATENT DOCUMENTS

| EP | 2 100 795 A2 | 9/2009 |
| JP | A-2005-534574 | 11/2005 |
| WO | WO 2009/047516 A1 | 4/2009 |

OTHER PUBLICATIONS

Sep. 18, 2014 Search Report issued in European Application No. 14165553.

* cited by examiner

*Primary Examiner* — Drew Brown
(74) *Attorney, Agent, or Firm* — Oliff PLC

(57) ABSTRACT

A steering system configured so that the possibility of occurrence of half-lock is significantly reduced is provided. A fastening mechanism has a pair of fastening members that fasten a pair of stationary side plates of a stationary bracket fixed to a vehicle body and a pair of movable side plates of a column bracket fixed to an upper jacket. A stationary tooth row is provided at only one location, that is, a first edge portion located on a steering member side of a tilt slot in a left stationary side plate. A second cam that serves as the fastening member has a first fastening portion that fastens the first edge portion adjacent to the tilt slot. A movable tooth row having teeth that are engaged with teeth of the stationary tooth row is provided in the first fastening portion.

3 Claims, 5 Drawing Sheets

STEERING SYSTEM

INCORPORATION BY REFERENCE

The disclosure of Japanese Patent Application No. 2013-091705 filed on Apr. 24, 2013 including the specification, drawings and abstract, is incorporated herein by reference in its entirety.

BACKGROUND OF THE INVENTION

1. Field of the Invention

The invention relates to a steering system.

2. Description of the Related Art

There is a steering system including a lock mechanism having a structure for enhancing the lock retention strength using the engagement of teeth in order to establish tilt lock in which a steering column is tilted at a prescribed angle with respect to a vehicle body and the steering column is secured to the vehicle body in the tilting state, as described in, for example, Published Japanese Translation of PCT Application No. 2005-534574 (JP 2005-534574 A). In the structure described in JP 2005-534574 A, a vertical cutout is formed in one side face of a U-shaped thin plate of a vehicle body support portion, and a toothed strip having a pair of vertical rows of locking teeth is fitted in the cutout. When the toothed strip is fitted in the cutout, the vertical rows of locking teeth are respectively located on the opposite sides of the cutout. A locking element held by a pin of a clamp mechanism has a pair of rows of locking teeth. The locking teeth of the locking element are engaged with the locking teeth of the toothed strip.

However, when the locking teeth of the toothed strip and the locking teeth of the locking element are engaged with each other, there is a possibility that half-lock in which top lands of the locking teeth of the toothed strip and top lands of the locking teeth of the locking element are in contact with each other will occur.

SUMMARY OF THE INVENTION

One object of the invention is to provide a steering system configured so that the possibility of occurrence of half-lock is significantly reduced.

A steering system according to an aspect of the invention includes: a stationary bracket including a pair of stationary side plates fixed to a vehicle body, a tilt slot being formed in each of the stationary side plates; a steering column by which a steering shaft having one end to which a steering member is coupled is rotatably supported, and that is tiltable about a tilt-center shaft; a movable bracket including a pair of movable side plates fixed to the steering column, an insertion slot being formed in each of the movable side plates; and a fastening mechanism including a fastening shaft passed through the tilt slots and the insertion slots, and a pair of fastening members that are supported by the fastening shaft and that fasten the corresponding stationary side plates from outside, the fastening mechanism achieving tilt lock by pressing the stationary side plates against the corresponding movable side plates. Each of the fastening members includes a first fastening portion and a second fastening portion that respectively fasten a first edge portion and a second edge portion of the corresponding stationary side plate, the first edge portion being located on a steering member side of the tilt slot and the second edge portion being located on an opposite side of the tilt slot from the first edge portion. The fastening mechanism includes: a stationary tooth row that is provided only in the first edge portion located adjacent to the tilt slot in one of the pair of stationary side plates, as a portion formed integrally with the corresponding stationary side plate or as a portion formed separately from the corresponding stationary side plate; and a movable tooth row provided in the first fastening portion of the fastening member that fastens the stationary side plate in which the stationary tooth row is provided, teeth of the movable tooth row being engaged with teeth of the stationary tooth row.

In the steering system according to the above aspect, the stationary tooth row is provided in only one location, that is, the first edge portion (located on the steering member side of the tilt slot) in one of the stationary side plates. In the above aspect, the possibility of occurrence of half-lock is significantly lower than that in a conventional configuration in which the stationary tooth rows are formed on respective two locations at the opposite edge portions of a cutout (tilt slot). Because the stationary tooth row is provided only in the first edge portion located on the steering member side of the tilt slot, the distance from the tilt-center shaft to the stationary tooth row is longer than that in the case where the stationary tooth row is provided only in the edge portion that is on the opposite side of the tilt slot from the steering member. That is, the length of the arm of moment about the tilt-center shaft is set longer. Therefore, it is possible to reduce the load borne by the stationary tooth row and the movable tooth row for generating a moment that opposes the moment about the tilt-center shaft due to the load applied to the steering member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
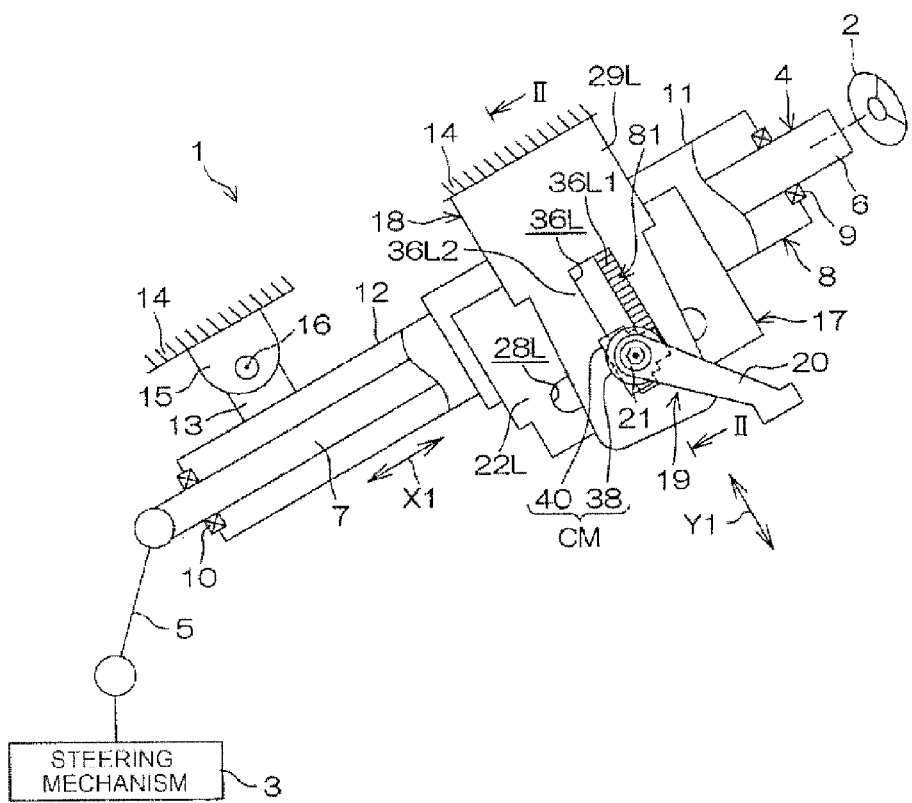
FIG. 1 is a schematic diagram of a steering system according to a first embodiment of the invention, illustrating the schematic configuration of the steering system as viewed from the left side of the steering system.

Hereinafter, example embodiments of the invention will be described with reference to the accompanying drawings. FIG. 1 is a schematic diagram illustrating the schematic configuration of a steering system 1 according to an embodiment of the invention. As illustrated in FIG. 1, the steering system 1 includes a steering member 2 such as a steering wheel, and a steering mechanism 3 that steers steered wheels (not illustrated) in response to a steering operation of the steering member 2. As the steering mechanism 3, for example, a rack-and-pinion mechanism is used.

The steering member 2 and the steering mechanism 3 are mechanically connected to each other via a steering shaft 4, an intermediate shaft 5, and the like. The rotation of the steering member 2 is transferred to the steering mechanism 3 via the steering shaft 4, the intermediate shaft 5, and the like. The rotation transferred to the steering mechanism 3 is converted into an axial linear motion of a rack shaft (not illustrated). The linear motion of the rack shaft in the axial direction causes the steered wheels to be steered.

The steering shaft 4 includes a tubular upper shaft 6 and a tubular lower shaft 7 that are fitted together so as to be slidable relative to each other through, for example, spline-fitting or serration-fitting. The steering member 2 is coupled to one end of the upper shaft 6. The steering shaft 4 is allowed to extend and contract in a telescopic direction X1 that coincides with the axial direction of the steering shaft 4. The steering shaft 4 is passed through a tubular steering column 8 and rotatably supported by the steering column 8 via a plurality of bearings 9, 10.

The steering column 8 includes a tubular upper jacket 11 (movable jacket) and a lower jacket 12 that are fitted together so as to be slidable relative to each other. The upper jacket 11 is disposed radially outward of the lower jacket 12. The steering column 8 is allowed to extend and contract as the upper jacket 11, which is a movable jacket, slides in the axial direction (telescopic direction X1) relative to the lower jacket 12. The upper shaft 6 is rotatably supported by the upper jacket 11 via the bearing 9. Further, the upper jacket 11, which is a movable jacket, is coupled to the upper shaft 6 via the bearing 9 so as to be movable together with the upper shaft 6 in the axial direction of the steering shaft 4 (the telescopic direction X1).

A movable bracket 13 located on the lower side is fixed to the outer periphery of the lower jacket 12 so as to be movable together with the lower jacket 12. The movable bracket 13 is rotatably supported, via a tilt-center shaft 16, by a stationary bracket 15 located on the lower side and fixed to a vehicle body 14. Thus, the steering column 8 and the steering shaft 4 are allowed to pivot (tilt) about the tilt-center shaft 16 that serves as a fulcrum. By pivoting (tilting) the steering shaft 4 and the steering column 8 about the tilt-center shaft 16 that serves as a fulcrum, so-called tilt adjustment for adjusting the position of the steering member 2 is made. Further, by extending and contracting the steering shaft 4 and the steering column 8 in the axial direction (telescopic direction X1), so-called telescopic adjustment for adjusting the position of the steering member 2 is made.

A movable bracket 17 (corresponding to a distance bracket) located on the upper side and movable together with the upper jacket 11 is fixed to the upper jacket 11. A stationary bracket 18 located on the upper side is fixed to the vehicle body 14. When the movable bracket 17 and the stationary bracket 18 are fastened and locked to each other by a fastening mechanism 19, the position of the steering column 8 is fixed relative to the vehicle body 14 and thus the position of the steering member 2 is fixed. The fastening mechanism 19 includes an operating lever 20 and a fastening shaft 21. The operating lever 20 is manually rotated by a driver. The fastening shaft 21 is rotated together with the operating lever 20, and extends through the stationary bracket 18 and the movable bracket 17.

Figure 2:
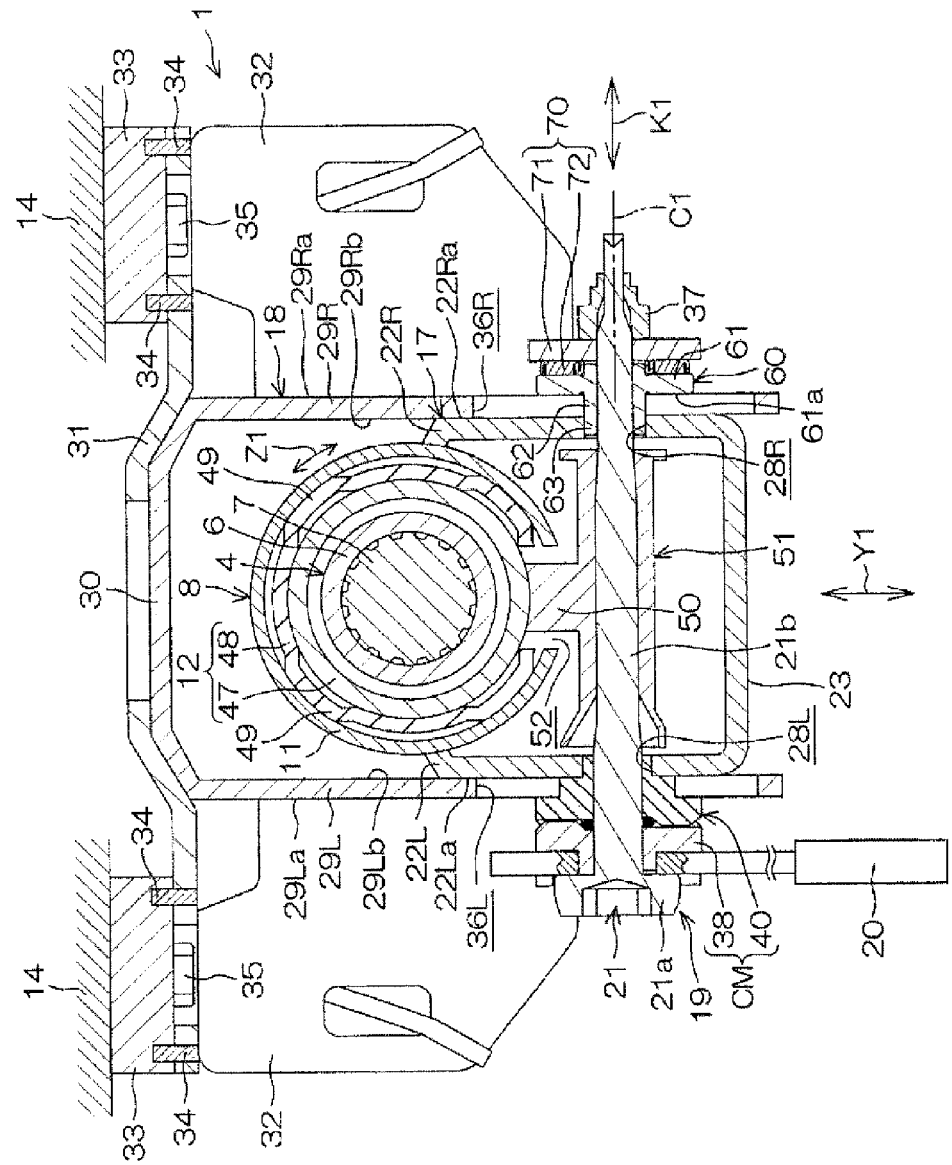
FIG. 2 is a cross-sectional view of the steering system taken along the line II-II in FIG. 1.

FIG. 2 is a cross-sectional view schematically illustrating the steering system 1 taken along the line II-II in FIG. 1. As illustrated in FIG. 2, the movable bracket 17 is a member that is formed in a U-shape in cross-section, open toward the upper side in FIG. 2, and formed into a bilaterally symmetrical shape. Specifically, the movable bracket 17 includes a pair of right and left movable side plates 22R, 22L and a connection plate 23. The movable side plates 22R, 22L face each other. The connection plate 23 connects one ends (lower ends in FIG. 2) of the movable side plates 22R, 22L to each other.

The movable side plates 22R, 22L have telescopic slots 28R, 28L that are transversely long insertion slots extending in the telescopic direction X1 (see FIG. 1, the direction orthogonal to the sheet on which FIG. 2 is drawn). The steering shaft 4 and the steering column 8 are allowed to extend and contract within a range of the length of the telescopic slots 28R, 28L in the longitudinal direction (telescopic direction X1). The other ends (upper ends in FIG. 2) of the movable side plates 22R, 22L are fixed to the outer peripheral face of the upper jacket 11.

The stationary bracket 18 includes a pair of right and left stationary side plates 29R, 29L, a connection plate 30, a plate-like attachment stay 31, and a pair of reinforcing extension plates 32. The stationary side plates 29R, 29L face each other. The connection plate 30 connects one ends (upper ends in FIG. 2) of the stationary side plates 29R, 29L to each other. The attachment stay 31 is fixed to the upper face of the connection plate 30. The reinforcing extension plates 32 extend outward from the edges of the stationary side plates 29R, 29L so as to be orthogonal to the stationary side plates 29R, 29L. The stationary side plates 29R, 29L and the connection plate 30 constitute a member that is formed in a U-shape in cross section, and open toward the lower side in FIG. 2. The steering shaft 4, the steering column 8, and the movable bracket 17 are disposed between the stationary side plates 29R, 29L of the stationary bracket 18, as illustrated in FIG. 2.

The stationary bracket 18 is fixed to the vehicle body 14 via a pair of attachment members 33 coupled to the attachment stay 31. The attachment members 33 and the attachment stay 31 are coupled to each other with synthetic resin pins 34 that pass through the attachment stay 31 and that break at the time of absorbing shocks. Each of the attachment members 33 is fixed to the vehicle body 14 with a fixing bolt 35. Inner faces 29Rb, 29Lb of the stationary side plates 29R, 29L of the stationary bracket 18 face outer faces 22Ra, 22La of the movable side plates 22R, 22L of the movable bracket 17, respectively. The stationary side plates 29R, 29L respectively have vertically long tilt slots 36R, 36L that extend in the up-down direction in FIG. 2 (corresponding to a tilt direction Y1 in FIG. 1). The fastening shaft 21 of the fastening mechanism 19 is passed through the telescopic slots 28R, 28L and the tilt slots 36R, 36L.

The fastening mechanism 19 has the function of fastening the stationary bracket 18 to cause the stationary bracket 18 to lock the movable bracket 17, and pressing the lower jacket 12 to lock the lower jacket 12 relative to the upper jacket 11. Specifically, the fastening mechanism 19 includes the fastening shaft 21, a nut 37, a first cam 38, a second cam 40, a first intervening member 60, a second intervening member 70, a push-up cam 50, and the like. The fastening shaft 21 is rotatable together with the operating lever 20 about a central axis C1, and passed through the tilt slots 36R, 36L and the telescopic slots 28R, 28L. The nut 37 is screwed to a threaded portion formed in one end portion of the fastening shaft 21. The first cam 38 is fitted on the outer periphery of a shaft portion 21b of the fastening shaft 21, and used to fasten the right side plates 29R, 22R and the left side plates 29L, 22L. The second cam 40 serves as a fastening member. The push-up cam 50 pushes the lower jacket 12 upward in the tilt direction Y1. The first cam 38 and the second cam 40 (fastening member) constitute a cam mechanism CM.

The push-up cam 50 is an eccentric cam that is formed integrally with a sleeve 51 from the same material as that of the sleeve 51 that is fitted to a shaft portion 20b of the fastening shaft 21 through, for example, serration fitting so as to be rotatable together with the fastening shaft 21. The push-up cam 50 has the function of pushing, through an opening 52 of the upper jacket 11, the lower jacket 12 upward in the tilt direction Y1 against the inner periphery of the upper jacket 11 at the time of locking by the fastening mechanism 19.

A plurality of cam protrusions (not illustrated) is formed in each of the opposed faces of the first cam 38 and the second cam 40 of the cam mechanism CM. The cam protrusions of the first cam 38 and the cam protrusions of the second cam 40 are engaged with each other. The first cam 38 and the second cam 40 are disposed in the vicinity of a head portion 21a of the fastening shaft 21. The first cam 38 and the operating lever 20 are coupled to the head portion 21a of the fastening shaft 21 so as to be rotatable together with the fastening shaft 21 but immovable relative to the fastening shaft 21 in the axial direction.

Figure 3:
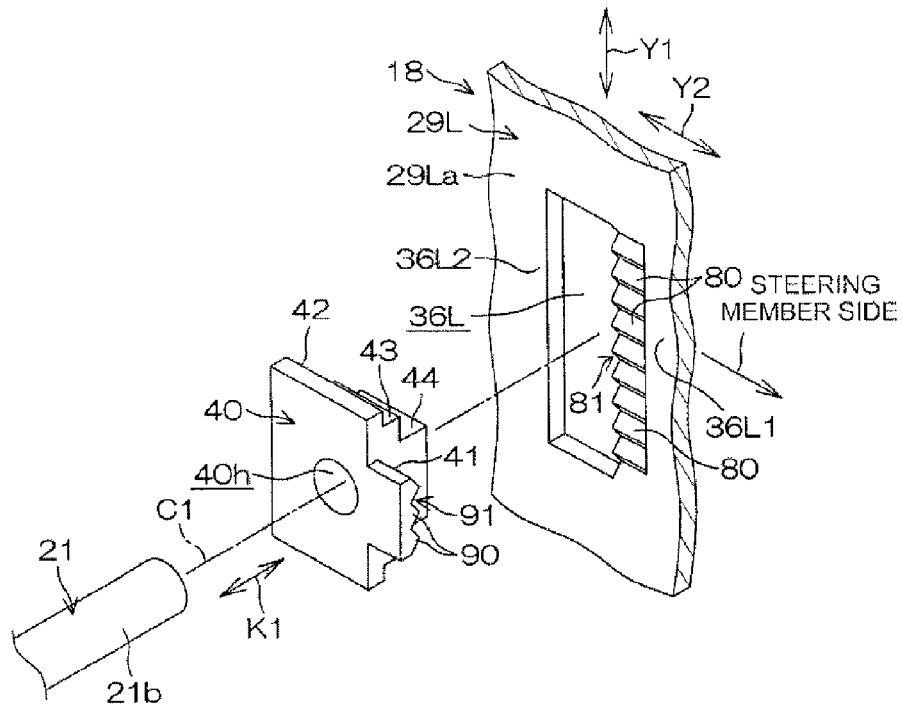
FIG. 3 is an exploded perspective view schematically illustrating a fastening shaft, a second cam (fastening member), and a left stationary side plate.

The stationary side plate 29L located on the operating lever 20 side (left side) has a first edge portion 36L1 located on the steering member 2 side (right side) of the (left) tilt slot 36L, and a second edge portion 36L2 located on the opposite side (left side) of the tilt slot 36L1 from the first edge portion 36L1. As illustrated in FIG. 1 and FIG. 3 described below, a stationary tooth row 81 formed of a plurality of stationary teeth 80 aligned in the tilt direction Y1 is formed only in the first edge portion 36L1 (located on the right side of the tilt slot 36L) of the stationary side plate 29L located on the operating lever 20 side (left side). The second edge portion 36L2 (the left edge portion) is formed in a flat face.

Figure 4:
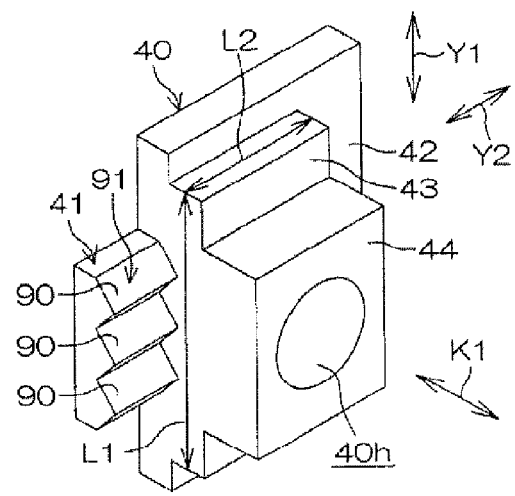
FIG. 4 is a perspective view of the second cam (fastening member) as viewed from the back side of the second cam.

FIG. 3 is an exploded perspective view illustrating the fastening shaft 21, the second cam 40 (fastening member), and the left stationary side plate 29L. FIG. 4 is a perspective view of the second cam 40 (fastening member) as viewed from the back side of the second cam 40. As illustrated in FIG. 3 and FIG. 4, the second cam 40, which serves as the fastening member, has an insertion hole 40h through which the fastening shaft 21 is passed, and is fitted to the outer periphery of the shaft portion 21b of the fastening shaft 21 so as to be rotatable relative to the fastening shaft 21. As illustrated in FIG. 3, the second cam 40 has a first fastening portion 41, a second fastening portion 42, a tilt guide portion 43, and a telescopic guide portion 44. The first fastening portion 41 fastens the first edge portion 36L1 (located on the right side of the tilt slot 36L) in an outer face 29La of the left stationary side plate 29L. The second fastening portion 42 fastens the second edge portion 36L2 (located on the left side of the tilt slot 36L) in the outer face 29La of the left stationary side plate 29L. The tilt guide portion 43 is located between the first fastening portion 41 and the second fastening portion 42, and inserted in the tilt slot 36L. The telescopic guide portion 44 extends from the tilt guide portion 43, and is inserted in the left telescopic slot 28L.

As illustrated in FIG. 4, the first fastening portion 41 has a movable tooth row 91 formed of a small number of (for example, three) movable teeth 90 that are engaged with the stationary teeth 80 of the stationary tooth row 81 to fasten the stationary tooth row 81 formed in the first edge portion 36L1 located on the right side of the tilt slot 36L. The second fastening portion 42 is formed in a flat face so as to conform to the second edge portion 36L2. The tilt guide portion 43 has the function of guiding the movement of the fastening shaft 21 in the tilt direction Y1 in the tilt slot 36L during the tilt adjustment performed in the state where fastening by the fastening mechanism 19 is cancelled. A first length L1 that is the length of the tilt guide portion 43 in the tilt direction Y1 is set longer than a second length L2 that is the length of the tilt guide portion 43 in a direction Y2 orthogonal to the tilt direction Y1 (L1>L2).

With reference to FIG. 2, the telescopic guide portion 44 has the function of guiding the movement of the fastening shaft 21 in the left telescopic slot 28L in the telescopic direction X1 (the direction orthogonal to the sheet on which FIG. 2 is drawn, see FIG. 1) during the telescopic adjustment performed in the state where fastening by the fastening mechanism 19 is cancelled. The first intervening member 60 and the second intervening member 70 are interposed between the nut 37 screwed to one end portion of the fastening shaft 21 and the right stationary side plate 29R of the stationary bracket 18.

The first intervening member 60 has a fastening portion 61, a tilt guide portion 62, and a telescopic guide portion 63. The fastening portion 61 has a fastening face 61a that extends along the outer face 29Ra of the right stationary side plate 29R of the stationary bracket 18 and that fastens the right stationary side plate 29R. The tilt guide portion 62 is fitted in the tilt slot 36R of the right stationary side plate 29R of the stationary bracket 18 so as to be slidable in the tilt direction Y1, and guides the tilt movement of the fastening shaft 21 during the tilt adjustment. The telescopic guide portion 63 is inserted in the telescopic slot 28R of the right movable side plate 22R of the movable bracket 17 so as to be slidable in the telescopic direction X1 (the direction orthogonal to the sheet on which FIG. 2 is drawn), and guides the telescopic movement of the fastening shaft 21 during the telescopic adjustment.

Although not illustrated, the tilt guide portion 62 has width across flats at a portion that is fitted in the vertically long tilt slot 36R of the right stationary side plate 29R, and thus the rotation of the tilt guide portion 62 is restricted by the tilt slot 36R. The second intervening member 70 includes a thrust washer 71 and a needle roller thrust bearing 72. The thrust washer 71 is interposed between the fastening portion 61 of the first intervening member 60 and the nut 37. The needle roller thrust bearing 72 is interposed between the thrust washer 71 and the fastening portion 61 of the first intervening member 60. Due to the function of the second intervening member 70 including the needle roller thrust bearing 72, the nut 37 is allowed to smoothly rotate together with the fastening shaft 21.

When the fastening shaft 21 rotates in response to a rotating operation of the operating lever 20, the first cam 38 moves the second cam 40 (fastening member) toward the left stationary side plate 29L of the stationary bracket 18. Thus, the fastening portions 41, 42 of the second cam 40 and the fastening portion 61 of the first intervening member 60 clamp and fasten the stationary side plates 29R, 29L of the stationary bracket 18 from outside. As a result, the side plates 29R, 29L of the stationary bracket 18 clamp the movable side plates 22R, 22L of the movable bracket 17, respectively, and the stationary side plates 29R, 29L are pressed against the movable side plates 22R, 22L, respectively. The movable teeth 90 of the movable tooth row 91 of the first fastening portion 41 of the second cam 40 (fastening member) are engaged with the stationary teeth 80 of the stationary tooth row 81 of the first edge portion 36L1 (located on the right side of the tilt slot 36L) of the left stationary side plate 29L. Thus, the movable bracket 17 is fastened by the stationary bracket 18, and firm lock is established.

The lower jacket 12 includes a metal tube 47 and a resin tube 48 fitted to the outer periphery of the metal tube 47. The resin tube 48 has a plurality of bulged portions 49 arranged at intervals in a circumferential direction Z1. Although not illustrated, the bulged portions 49 are formed at multiple positions of the resin tube 48 that are apart from each other in the axial direction. Note that the resin tube 48 may be omitted, and the bulged portions 49 may be formed on the outer periphery of the metal tube 47.

According to the present embodiment, the stationary tooth row 81 is formed in only one location, that is, the first edge portion 36L1 (located on the right side (the steering member 2 side) of the tilt slot 36L) in the stationary side plate 29L (the left stationary side plate). In the present embodiment, the possibility of occurrence of half-lock is significantly lower than that in a conventional configuration in which the stationary tooth rows are formed on respective two locations at the opposite edge portions of a cutout (tilt slot). Because the stationary tooth row 81 is formed only in the first edge portion 36L1 (left edge portion) located on the steering member 2 side of the tilt slot 36L, the distance from the tilt-center shaft 16 to the stationary tooth row 81 is longer than that in the case where the stationary tooth row 81 is formed only in the second edge portion 36L2 (the right edge portion) that is on the opposite side of the tilt slot 36L from the steering member 2. That is, the length of the arm of moment about the tilt-center shaft 16 is set longer. Therefore, it is possible to reduce the load borne by the stationary tooth row 81 and the movable tooth row 91 for generating a moment that opposes the moment about the tilt-center shaft 16 due to the load applied to the steering member 2.

Because the tilt guide portion 43 of the second cam 40 (fastening member), which is located between the first fastening portion 41 and the second fastening portion 42, is non-rotatably inserted in the tilt slot 36L, engagement between the stationary teeth 80 of the stationary tooth row 81 and the movable teeth 90 of the movable tooth row 91 is maintained and high lock retention strength is obtained. As illustrated in FIG. 4, because the first length L1 that is the length of the tilt guide portion 43 in the tilt direction Y1 is set longer than the second length L2 that is the length of the tilt guide portion 43 in the direction Y2 orthogonal to the tilt direction Y1 (L1>L2), the tilt guide portion 43 resists a high moment load caused by the input from the steering member 2 and thus a high lock retention strength is obtained by the engagement between the stationary teeth 80 of the stationary tooth row 81 and the movable teeth 90 of the movable tooth row 91.

Figure 5:
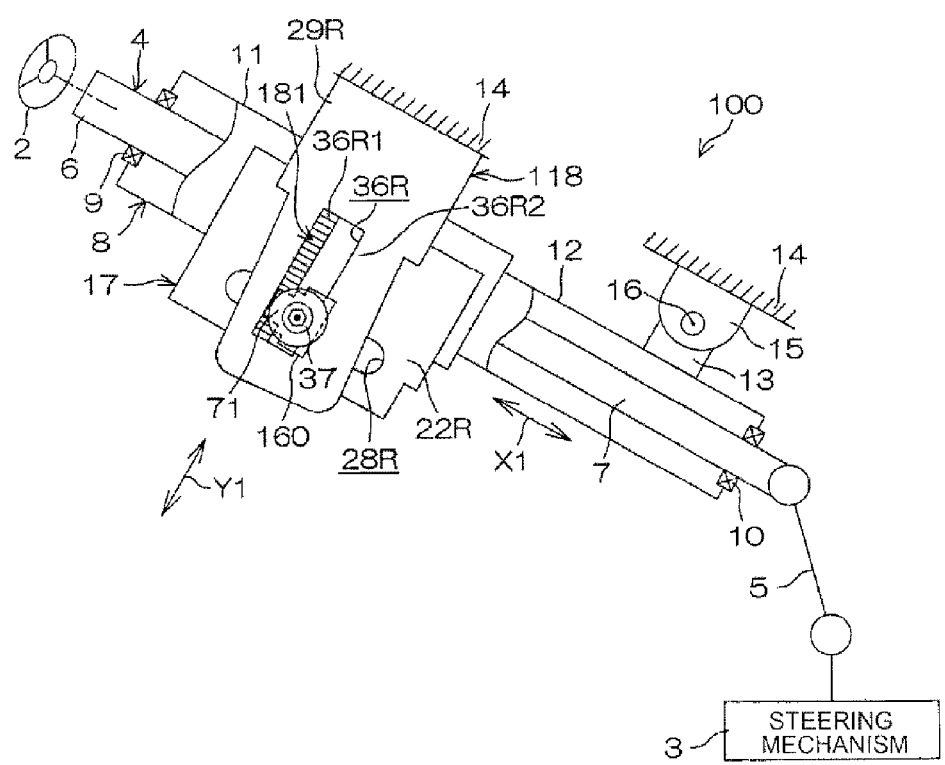
FIG. 5 is a schematic diagram of a steering system according to a second embodiment of the invention, illustrating the schematic configuration of the steering system as viewed from the right side of the steering system.
Figure 6:
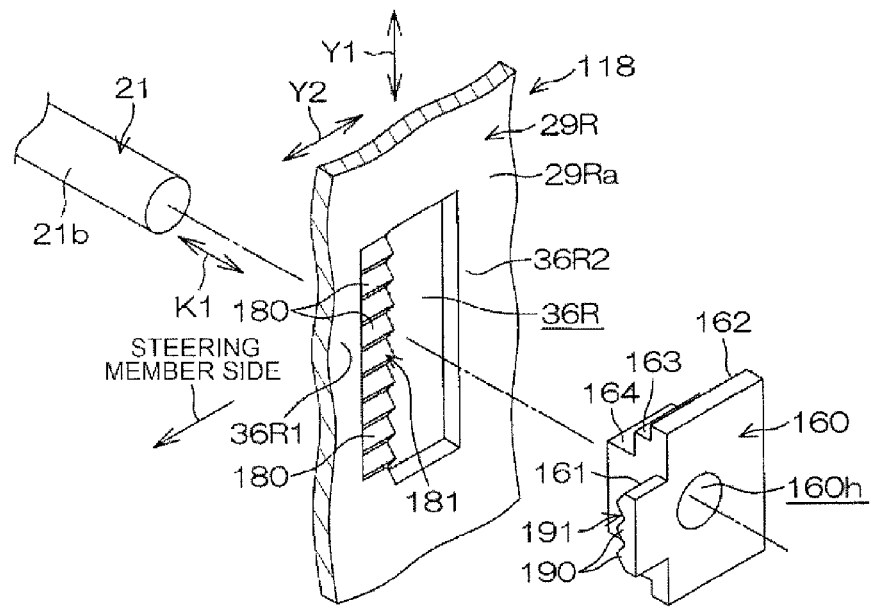
FIG. 6 is an exploded perspective view schematically illustrating a fastening shaft, a first intervening member (fastening member), and a right stationary side plate in the second embodiment.
Figure 7:
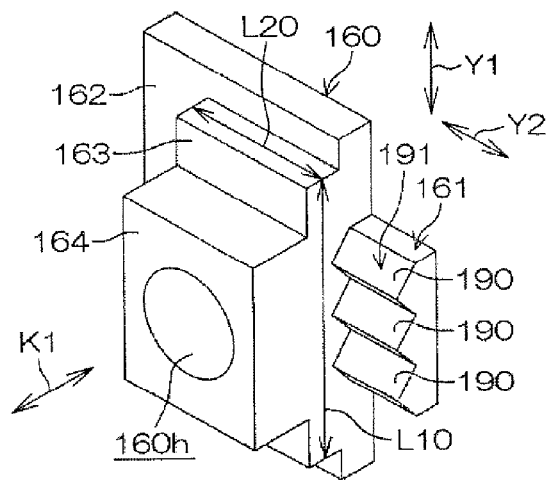
FIG. 7 is a perspective view of the first intervening member (fastening member) in the second embodiment, as viewed from the back side of the first intervening member.

FIG. 5, FIG. 6, and FIG. 7 illustrate a second embodiment of the invention. In the steering system 1 according to the first embodiment illustrated in FIG. 1, FIG. 3, and FIG. 4, the stationary tooth row 81 is formed in the first edge portion 36L1 (located on the right side of the tilt slot 36L) in the left stationary side plate 29L, and the movable tooth row 91 is formed in the second cam 40 so as to correspond to the stationary tooth row 81. On the other hand, in a steering system 100 according to the second embodiment, the stationary tooth row 81 of the left stationary side plate 29L of a stationary bracket 118 and the movable tooth row 91 of the second cam 40 (fastening member) are omitted, although not illustrated in the drawings. As illustrated in FIG. 5 and FIG. 6, a stationary tooth row 181 is formed only in a first edge portion 36R1 (located on the left side of the tilt slot 36R) in the right stationary side plate 29R, and a movable tooth row 191 is formed in the first intervening member 160.

That is, as illustrated in FIG. 6 and FIG. 7, the first intervening member 160 has a first fastening portion 161, a second fastening portion 162, a tilt guide portion 163, and a telescopic guide portion 164. The first fastening portion 161 fastens the first edge portion 36R1 (located on the left side of the tilt slot 36R) in the outer face 29Ra of the right stationary side plate 29R. The second fastening portion 162 fastens a second edge portion 36R2 (located on the right side of the tilt slot 36R) in the outer face 29Ra of the right stationary side plate 29R. The tilt guide portion 163 is located between the first fastening portion 161 and the second fastening portion 162, and inserted in the tilt slot 36R. The telescopic guide portion 164 extends from the tilt guide portion 163, and is inserted in the telescopic slot 28R (on the right side).

The first fastening portion 161 has the movable tooth row 191 formed of a small number of (for example, three) movable teeth 190 that are engaged with stationary teeth 80 of the stationary tooth row 81 to fasten the stationary tooth row 181 formed in the first edge portion 36R1 located on the left side of the tilt slot 36R. The second fastening portion 162 is formed in a flat face so as to conform to the second edge portion 36R2. The tilt guide portion 43 has the function of guiding the movement of the fastening shaft 21 in the tilt direction Y1 in the tilt slot 36R during the tilt adjustment performed in the state where fastening by the fastening mechanism 19 is cancelled. A first length L10 that is the length of the tilt guide portion 163 in the tilt direction Y1 is set longer than a second length L20 that is the length of the tilt guide portion 163 in the direction Y2 orthogonal to the tilt direction Y1 (L10>L20).

The telescopic guide portion 164 has the function of guiding the movement of the fastening shaft 21 in the right telescopic slot 28R in the telescopic direction X1 during the telescopic adjustment performed in the state where fastening by the fastening mechanism 19 is cancelled. In the second embodiment as well as in the first embodiment, the possibility of occurrence of half-lock is significantly reduced. Further, it is possible to reduce the load borne by the stationary tooth row 181 and the movable tooth row 191.

What is claimed is:

1. A steering system comprising:
    a stationary bracket including a pair of stationary side plates fixed to a vehicle body, a tilt slot being formed in each of the stationary side plates;
    a steering column rotatably supported by a steering shaft having one end to which a steering member is coupled, the steering column being tiltable about a tilt-center shaft;
    a movable bracket including a pair of movable side plates fixed to the steering column, an insertion slot being formed in each of the movable side plates; and
    a fastening mechanism including: (i) a fastening shaft passed through the tilt slots and the insertion slots, and (ii) a pair of fastening members supported by the fastening shaft, the pair of fastening members being configured to fasten the corresponding stationary side plates from outside, the fastening mechanism achieving tilt lock by pressing the stationary side plates against the corresponding movable side plates, wherein:
        each of the fastening members includes a first fastening portion and a second fastening portion that respectively fasten a first edge portion and a second edge portion of the corresponding stationary side plate, the first edge portion being located on a steering member side of the tilt slot and the second edge portion being located on an opposite side of the tilt slot from the first edge portion, and
        the fastening mechanism further includes a single stationary tooth row that is provided only in the first edge portion located adjacent to the tilt slot in one of the pair of stationary side plates, the stationary tooth row is formed integrally with the corresponding stationary side plate or as a portion formed separately from the corresponding stationary side plate, and a movable tooth row provided in the first fastening portion of the fastening member that fastens the stationary side plate in which the stationary tooth row is provided such that teeth of the movable tooth row are engaged with teeth of the stationary tooth row.

2. The steering system according to claim 1, wherein:
each of the fastening members includes a tilt guide portion located between the first fastening portion and the second fastening portion; and
the tilt guide portion is inserted in the tilt slot of the corresponding stationary side plate so as to be movable in a tilt direction and so as to be non-rotatable, and guides the fastening shaft along the tilt slot of the corresponding stationary side plate during tilt adjustment.

3. The steering system according to claim 2, wherein the tilt guide portion of the fastening member provided with the movable tooth row has a first length in the tilt direction and a second length in a direction orthogonal to the tilt direction, and the first length is set longer than the second length.

* * * * *